United States Patent
Yakobson

(12) 
(10) Patent No.: US 6,280,677 B1
(45) Date of Patent: Aug. 28, 2001

(54) PHYSICAL PROPERTY MODIFICATION OF NANOTUBES

(75) Inventor: Boris I. Yakobson, Cary, NC (US)

(73) Assignee: North Carolina State University, Raleigh, NC (US)

(*) Notice: Subject to any disclaimer, the term of this patent is extended or adjusted under 35 U.S.C. 154(b) by 0 days.

(21) Appl. No.: 09/186,396

(22) Filed: Nov. 4, 1998

Related U.S. Application Data

(60) Provisional application No. 60/064,539, filed on Nov. 5, 1997, now abandoned.

(51) Int. Cl.[7] ............................ B29C 35/02; B29B 17/00; H05B 6/00
(52) U.S. Cl. ........................ 264/430; 264/340; 264/345
(58) Field of Search ..................... 264/340, 234, 264/345, 430, 488, 232

(56) References Cited

U.S. PATENT DOCUMENTS

| | | | |
|---|---|---|---|
| 5,401,975 | 3/1995 | Ihara et al. | 250/492.3 |
| 5,482,601 | 1/1996 | Ohshima et al. | 204/173 |
| 5,591,312 | 1/1997 | Smalley | 204/157.41 |
| 5,626,812 | 5/1997 | Ebbesen et al. | 264/248 |
| 5,753,088 | 5/1998 | Olk | 204/173 |

OTHER PUBLICATIONS

Heyd et al. Uniaxial–stress effects on the electronic properties of carbon nanotubes, Mar. 15, 1997, Physical Review B, vol. 55, No. 11 pp. 6820–6823.*

Stephan et al., Curvature–induced bonding changed in carbon nanotubes investigated by electron energy–loss spectrometry, May 15, 1996, Physical Review B, vol. 53, No. 20, pp. 13824–13829.*

Charlier, J.–C., Ebbesen, T.W., and Lambin, P.; Structural and electronic properties of pentagon–heptagon pair defects in carbon nanotubes, Phys. Rev. B, 1996. 53(16): pp. 11108–11113.

Chico, L., et al.; Pure Carbon Nanoscale Devices: Nanotube Heterojunctions, Phys. Rev. Lett., 1996. 76(6): pp. 971–974.

Dunlap, B.I.; Connecting carbon tubules, Phys. Rev. B, 1992. 46(3): pp. 1933–1936.

Dresselhaus, M.S., Dresselhaus, G. and Eklund, P.C.; Science of Fullerenes and Carbon Nanotubes, 1996, San Diego: Academic Press pp. 902–905.

Yakobson, B.I. and Smalley, R.E.; Fullerene Nanotubes: $C_{1,000,000}$ and Beyond, American Scientist, 1997. 85(4): pp. 324–337.

Yakobson, B.I.; Mechanical relaxation and "intramolecular plasticity" in carbon nanotubes, Appl. Phys. Lettl, 1998. 72(8): pp. 918–920.

Yakobson, B.I.; Dynamic Topology and Yield Strength of Carbon Nanotubes, Fullerenes, Electrochemical Society, 1997, Paris: ECS, Pennington., pp. 549–560.

* cited by examiner

Primary Examiner—Christopher A. Fiorilla
(74) Attorney, Agent, or Firm—Myers Bigel Sibley & Sajovec, P.A.

(57) ABSTRACT

A method of modifying a physical property of a nanotube includes subjecting a nanotube having a defined lattice structure orientation to stress conditions sufficient to disrupt the lattice structure and form a dipole of dislocation cores therein, and wherein the dipole of dislocation cores split and propagate in the nanotube in a manner such that the dipole of dislocation cores are separated by at least one domain of modified structure, and wherein the physical properties of the nanotube are altered.

34 Claims, 3 Drawing Sheets

PHYSICAL PROPERTY MODIFICATION OF NANOTUBES

CROSS-REFERENCE TO RELATED APPLICATIONS

The instant application claims priority to U.S. Provisional Application Ser. No. 60/064,539 filed Nov. 5, 1997, abandoned the disclosure of which is incorporated by reference herein in its entirety.

FIELD OF THE INVENTION

The invention relates to processes involving nanotubes, and more specifically processes which are able to modify the physical properties of the nanotubes.

BACKGROUND OF THE INVENTION

Carbon nanotubes are known as elongated tubular bodies which are typically only a few atoms in circumference. Methods of forming carbon nanotubes are described, for example, in U.S. Pat. Nos. 5,753,088 and 5,482,601. The nanotubes are hollow and have a linear fullerene structure. Advantageously, the length of the nanotubes potentially may be millions of times greater than the molecular-sized diameter. Carbon nanotubes are currently being proposed for a number of applications since they possess a very desirable and unique combination of physical properties relating to, for example, strength and weight. The nanotubes have also demonstrated electrical conductivity. See Yakobson, B. I., et al., *American Scientist*, 85, (1997), 324–337; and Dresselhaus, M. S., et al., *Science of Fullerenes and Carbon Nanotubes*, 1996, San Diego: Academic Press, pp. 902–905. Investigative efforts regarding nanotubes have primarily focused on theoretical attempts to evaluate the nanotube molecular structure, and its potential relationship to physical properties.

Notwithstanding these efforts, there remains a need in art for a method to alter the physical properties of a nanotube such that it may be modified for various end use applications. For example, it would be particularly desirable to be able to alter the electrical properties within the nanotube such that the nanotube exhibits heterogeneous electrical behavior. As a result, the nanotube may be useful in microelectronic device applications which often demand high thermal conductivity, small dimensions, and light weight.

SUMMARY OF THE INVENTION

It is therefore an object of the invention to provide a method of modifying a physical property of a nanotube, such as an electrical property.

It is a further object of the invention to provide a nanotube having modified physical properties.

These and other objects and advantages are provide by the present invention. In one aspect, the invention provides a method of modifying a physical property of a nanotube. The method comprises subjecting a nanotube having a defined lattice structure orientation to stress conditions sufficient to disrupt the lattice structure orientation. A dipole of dislocation cores is formed therein, and the dipole of dislocation cores split and propagate in the nanotube in a manner such that the dipole of dislocation cores is separated by at least one domain of modified structure. As a result, at least one physical property of the nanotube is altered.

In one embodiment, the above method also includes exposing the nanotube to thermal conditions. In another embodiment, the method of the invention also includes the step of exposing the nanotube to radiation, preferably in the form of ultraviolet light or x-ray.

In a typical embodiment, the nanotube initially has a hexagonal core lattice structure and the application of stress disrupts this core lattice structure to form a dipole of pentagon-heptagon and heptagon-pentagon dislocation cores in the nanotube. These dislocation cores propagate throughout the nanotube such that a domain of modified lattice structure is formed between the dipole of dislocation cores as described herein.

In another aspect, the invention relates to a nanotube comprising: (1) a dipole of pentagon-heptagon dislocation cores located in an opposed spaced-apart relationship along a longitudinal axis of the nanotube; (2) a first region comprising a domain of modified lattice structure positioned between the dipole and formed by the dipole propagating throughout the nanotube as a result of stress being applied to the nanotube; and (3) second and third regions each positioned on opposite sides relative to the first region, the second and third regions comprising lattice structure domains which differ from the domain of modified lattice structure present in the first region such that the second and third regions possess a physical property different from the first region.

DETAILED DESCRIPTION OF THE PREFERRED EMBODIMENTS

Figure 1:
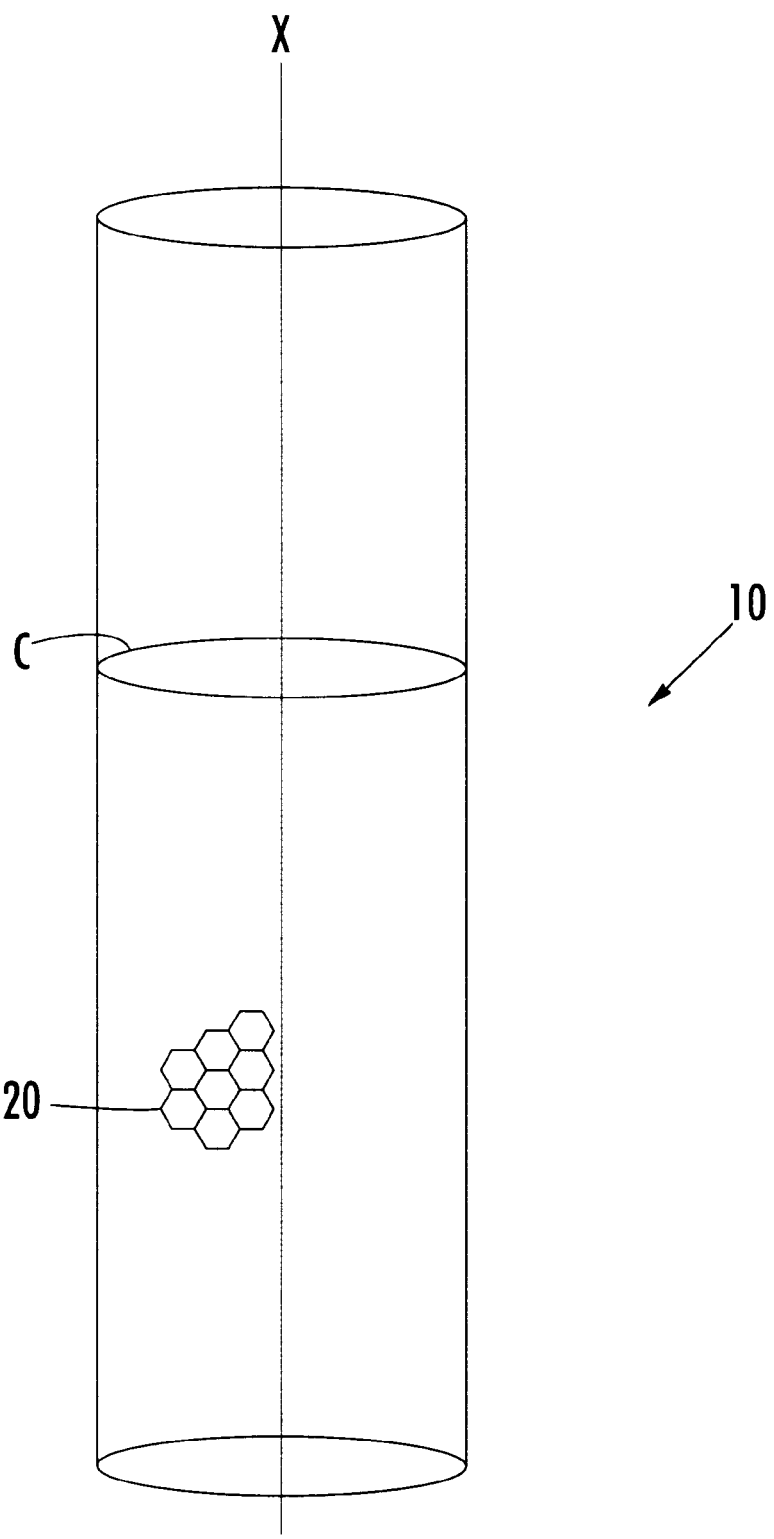
FIG. 1 illustrates a nanotube having a hexagonal core lattice structure.

The invention will now be described in greater detail with reference to the accompanying drawings and embodiments set forth in this section of the application. It is to be understood, however, that these embodiments are for illustrative purposes only, and do not in any way limit the scope of the invention which is defined by the claims.

In one aspect, the invention relates to a method of modifying one or more physical properties of a nanotube. Examples of physical properties which may be modified include, for example, mechanical and electrical properties. The method comprises subjecting a nanotube having a defined lattice structure orientation to stress conditions sufficient to disrupt the lattice structure and form a dipole of dislocation cores therein. The dipole of dislocation cores split and propagate in the nanotube in a manner such that the dislocation cores are separated by at least one domain of modified structure, and wherein at least one physical property of the nanotube is altered. As described in greater detail herein, the chirality, or more specifically helicity, of the nanotube is altered during the method of the invention. In particular, the domain of modified lattice structure located between the dipole of dislocation cores experiences a transformation in chirality. For the purposes of the invention, the term "chirality" may be defined as a corkscrew symmetry of the nanotube, specified, for example, by the angle between the nanotube circumference and the zig-zag motif in the honeycomb atomic structure of the nanotube wall. The chirality may also be defined as a pair of integers $(c_1,c_2)$ marking the circumference of the nanotube in a standard basis for a hexagonal lattice, wherein $c_1$ and $c_2$ may each individually range from 0 to 30, provided that both $c_1$ and $c_2$ may not simultaneously be 0.

For the purposes of the invention, a "nanotube" is defined conventionally, and is a tubular, strand-like structure which has a circumference on the atomic scale. The typical diameter of a nanotube ranges from about 1 nm to about 10 nm. The nanotube may be formed from various materials such as, for example, carbon, boron nitride, and composites thereof. The nanotube typically is formed from carbon. In such an embodiment, the nanotube is formed as a fullerene molecule containing a hexagonal lattice structure. Methods for making carbon nanotubes are known in the art, and are described, for example, in U.S. Pat. Nos. 5,753,088 to Olk and 5,482,601 to Ohshima et al., the disclosures of which are incorporated herein by reference in their entirety.

The stress applied to the nanotube is typically carried out using conventional equipment. For the purposes of the invention, a magnitude of stress is typically applied such that the nanotube lattice structure is altered or disrupted as set forth herein, with the nanotube elongating preferably from about 1 to about 15 percent, and more preferably from about 3 to about 8 percent. The stress may be applied to the nanotube in various forms like, for example, tensile stress, torsional stress, bending stress, and combinations of the above. The magnitude of the applied stress preferably ranges from about 30 MPa to about 80 MPa.

The method of the invention may take place over various periods of time. Preferably, the method is carried out from about 1 min to about 180 min.

The method of the invention may also include other types of processing to alter one or more physical properties of the nanotube. For example, the method may further comprise subjecting (e.g., exposing) the nanotube to thermal conditions (i.e., heat) using conventional techniques. In this embodiment, the temperature to which the nanotube is exposed preferably ranges from about 500° C. to about 1800° C. If so desired, the nanotube may be further subjected (e.g., exposed) to radiation, preferably ultraviolet radiation, x-ray radiation, or combinations thereof.

The method of the invention will now be described in greater detail with reference to the drawings. FIG. 1 illustrates a carbon nanotube 10 having a lattice structure orientation represented by the chirality vector (10,10). The nanotube 10 may be characterized by having a virtually defect-free lattice structure as represented by the hexagonal cores 20 in FIG.1. Force is then applied to the nanotube 10 in the manner described herein. Although not wishing to be bound by any theories, it is believed that an initial slip in the lattice structure occurs by rotating a bond in the lattice structure, typically a lattice bond originally orientated along the circumference c of the nanotube, such as a dipole that is represented by a vector ±(0,1). Equivalently, a similar degeneracy may take place for a dipole that is ±(1,0). The above physical phenomena is described in detail in Provisional Application Ser. No. 60/064,539 filed Nov. 5, 1997.

Figures 2A, 2B, 2C:
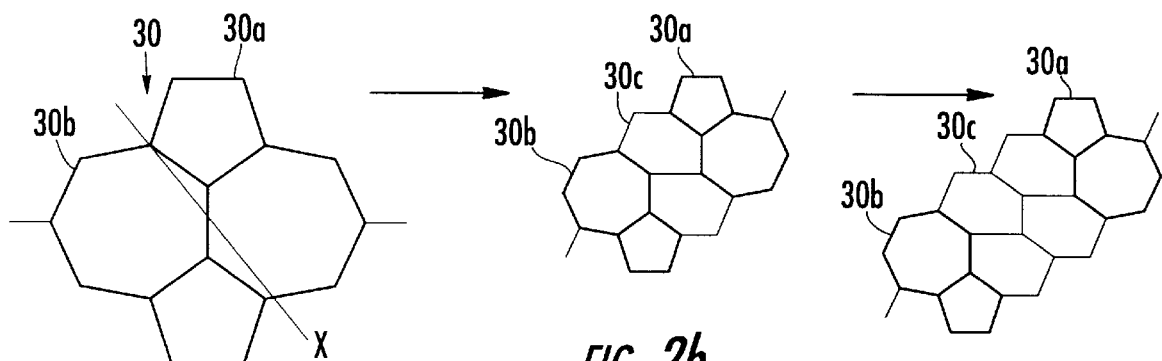
FIG. 2a illustrates a dipole of dislocation cores formed in the nanotube described in FIG. 1.
FIGS. 2b and 2c illustrates the propagation of the dipole of dislocation cores in the nanotube.

As a result of the application of stress, a dislocation dipole 30 is formed in the nanotube as shown in FIG. 2a. For the purposes of the invention, the term "dislocation dipole" is defined as a pair of lattice structures formed in the nanotube as a result of the application of stress which are distinguishable from the lattice structure of the nanotube prior to application of stress. In this illustrated embodiment, the dislocation dipole has a pentagon-heptagon (5–7) 30a and heptagon-pentagon (7–5) 30b lattice structure. As force continues to be applied to the nanotube 10, the dislocation dipole 30 propagates in opposed directions from a reference point x in the nanotube, thus gilding along a spiral "slip plane". The dipole propagation is depicted in FIGS. 2b and 2c, as well as FIG. 3 which illustrates a spiral path of propagation p for the dipoles 30a and 30b relative to the longitudinal axis I of the nanotube 10'. As illustrated, stress is applied axially to the nanotube as denoted by the opposing arrows in FIG. 3. During the propagation, the region between the propagating dipole 30a and 30b evolves into a new lattice structure, namely one comprised of hexagons (depicted by 30c) having a orientation different (i.e., by 2 degrees) from the initial hexagonal structure referred to above. Expressed differently, a (10,10) nanotube having a chiral angle of κ=30° for a (10,10) nanotube changes to a chiral angle of κ=28° for a (10,9) nanotube which has a modified hexagonal lattice structure. Thus, the chirality (i.e., helicity) of the domain of modified lattice structure 30c undergoes a transformation, and at least one electrical property of the domain of modified lattice structure is altered. Using the example of a nanotube having an initial chirality vector of (10,10), the chirality of the domain of modified lattice structure becomes (10,9). The lattice structure having the (10,10) vector is metallic, and may have an electrical resistivity ranging from about $10^{-6}$ Ωcm to about $10^{-4}$ Ωcm. The domain of modified lattice structure, in this example, is characterized in having a (10,9) vector and is considered to be a semiconductor having an energy band gap ranging from about 0.5 eV to about 1.5 eV (electron-volts).

Figure 3:
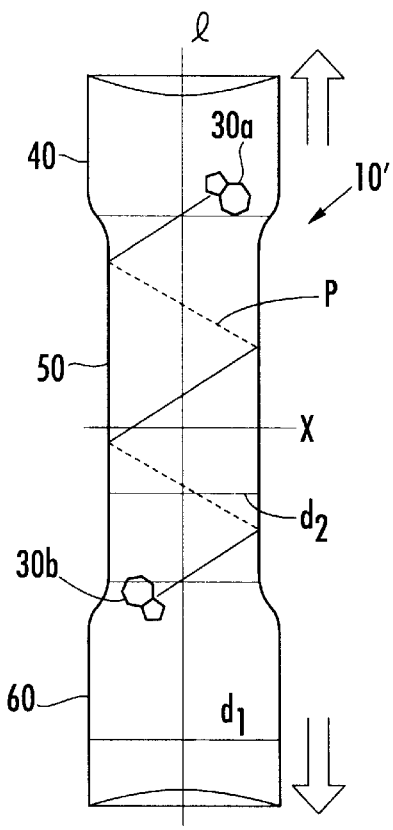
FIG. 3 illustrates a nanotube having an altered lattice structure.

As a result of the method of the invention, the nanotube 10 elongates and the diameter changes in a step-wise fashion ($d_1$ to $d_2$) which is illustrated in FIG. 3. As shown by FIG. 3, a first region 50 is present in the resulting nanotube 10' and comprises a domain of modified lattice structure as described herein (see 30c in FIGS. 2b and 2c) positioned between the dipole of dislocation pairs 30a and 30b. The first region 50 is formed by the dipole propagating throughout the nanotube as a result of stress being applied to the nanotube. Second and third lattice structure regions, 40 and 60 respectively, are positioned adjacent to each of the dislocation structures 30a and 30b and opposite to the first region 50. The second 40 and third 60 regions of the nanotube 10' possess lattice structures that are different from the first region 50 such that the physical properties of the second and third regions differ from those in the first region 50.

Typically, the second and third regions have the hexagonal lattice structure similar, and in most cases identical, to unstressed structure of the nanotube, and thus have similar lattice structures. It should be appreciated, however, that for the purposes of the invention, the second and third regions may have different lattice structures.

Figure 4:
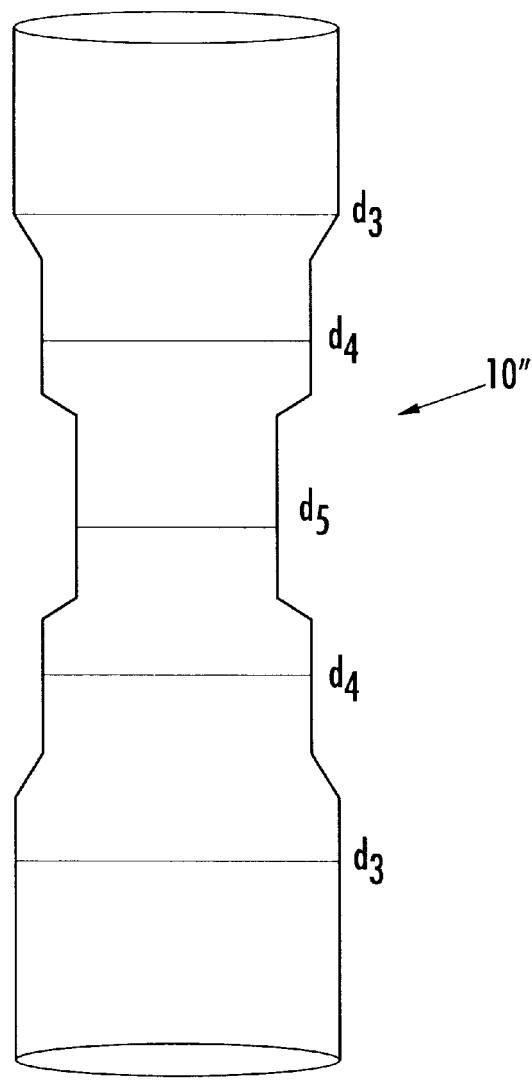
FIG. 4 illustrates a nanotube having multiple dipoles of dislocation cores formed therein.

When the dislocation dipole propagates (i.e., glides) away in opposed directions along the longitudinal axis I of the nanotube 10, at least one other dislocation dipole may be formed in the nanotube and thus may further narrow the diameter of the elongated nanotube and increase its elongation of the tube. Thus, a nanotube 10" having multiple diameters ($d_3$ through $d_5$) may be formed as illustrated in FIG. 4. The nanotube 10" contains various regions which may have different lattice structures. More particularly, the lattice structures of these regions may vary in terms of minimum energy band gap from 0 (metal) to a very large number such that the region(s) are not electrically conductive. A chirality vector illustrating the formation and propagation of multiple dislocation core dipoles may be illustrated as follows for a (10,10) nanotube:

(10,10)→(10,9)→(10,8) → ... →(10,0)→[(9,1) or (10,−1)]→(9, 0)→[(8,1) or (9,−1)]→(8,0)→[(7,1) or (8,−1)]→(7,0) etc.

Figure 5:
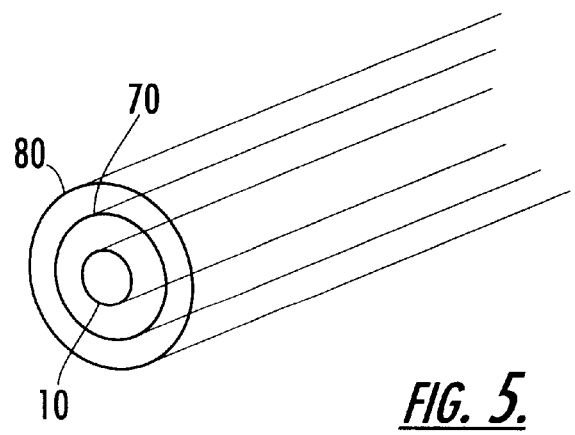
FIG. 5 illustrates a configuration of multiple concentric nanotubes.

The nanotube 10 may be used in conjunction with multiple nanotubes (80 and 70) of differing diameters such that the nanotubes form a layered concentric structure as illustrated in FIG. 5.

In general, the nanotubes of the invention are advantageous in that they may be incorporated into various articles of manufacture such as, but not limited to, infrared sensors for thermal imaging, nanoscale diodes, photoelectric cells, (molecular) nanoscale transistors for submicroelectric devices.

Employing the method of the invention, the nanotubes may be present as heterojunctions, and accordingly are desirable for use as integrated circuit devices which require high radiation resistance, light weight, and thermal stability.

In yet another aspect, the invention relates to a method of altering the chemical functionality of a nanotube. The method includes providing a nanotube having dislocation cores (as defined above) formed therein and a reactive component. The reactive component may be selected from various components containing chemically reactive substituents such as, but not limited to, hydroxy, carboxy, amino, and the like, as well as specific ligands for protein binding. The reactive component, namely the chemically reactive substituents, react with the dislocation cores such that the chemical functionality of the nanotube is altered. This method may be carried out using known techniques and equipment.

The nanotube having chemically altered functionality is useful in that it may be useful in a variety of end use applications that may require such a modified structure. Examples of end use applications include, but are not limited to, chemical sensors for local environment characterization, intracellular nanoprobes for biological and medical studies, and medical connects/bridges between other molecules or particles.

Disclosed herein are specific preferred embodiments as described by the above specification and accompanying drawings. It should be appreciated, however, that this disclosure is only meant to illustrate the invention, with the scope of the invention being defined by the claims.

That which is claimed:

1. A method of modifying a physical property of a nanotube, said method comprising:
    subjecting a nanotube having a defined lattice structure orientation to stress conditions sufficient to disrupt the lattice structure and form a dipole of dislocation cores therein, and wherein the dipole of dislocation cores split and propagate in the nanotube in a manner such that the dislocation cores are separated by at least one domain of modified lattice structure, and wherein the physical property of the nanotube is altered.

2. The method according to claim 1, wherein the physical property is an electrical property.

3. The method according to claim 1, wherein said nanotube comprises carbon or boron nitride.

4. The method according to claim 1, wherein said subjecting step further comprises subjecting the nanotube to thermal conditions.

5. The method according to claim 4, wherein said subjecting step is carried out at a temperature ranging from about 500° C. to about 1800° C.

6. The method according to claim 1, wherein said subjecting step results in the nanotube elongating from about 3 to about 10 percent.

7. The method according to claim 1, wherein said method further comprises the step of subjecting the nanotube to radiation.

8. The method according to claim 7, wherein the radiation is ultraviolet light.

9. The method according to claim 1, wherein said subjecting step comprises subjecting the nanotube to stress selected from the group consisting of tensile stress, torsional stress, bending stress, and combinations thereof.

10. A method of modifying a physical property of a carbon nanotube, said method comprising:
    subjecting the carbon nanotube having a hexagonal core lattice structure to stress and thermal conditions sufficient to disrupt the lattice structure and form a dipole of pentagon-heptagon and heptagon-pentagon dislocation cores therein, and wherein the dipole of dislocation cores propagate throughout the nanotube in a manner such that a domain of modified lattice structure is formed between the dipole of dislocation cores to alter a physical property of the nanotube.

11. The method according to claim 10, wherein the physical property is an electrical property.

12. The method according to claim 10, wherein said subjecting step is carried out at a temperature ranging from about 500° C. to about 1800° C.

13. The method according to claim 10, wherein said method further comprises the step of subjecting the nanotube to radiation.

14. The method according to claim 13, wherein the radiation is selected from the group consisting of ultraviolet radiation, x-ray radiation, and combinations thereof.

15. The method according to claim 10, wherein said subjecting step is carried out such that at least one heterojunction is formed in the nanotube.

16. The method according to claim 10, wherein said subjecting step comprises subjecting the nanotube to stress selected from the group consisting of tensile stress, torsional stress, bending stress, and combinations thereof.

17. The method according to claim 10, wherein said nanotube has a defined lattice structure orientation characterized by a (10,10) chirality vector, and wherein the domain of modified lattice structure has a chirality vector of (10,9).

18. A method of modifying a physical property of a nanotube, said method comprising:
    subjecting a nanotube having a defined lattice structure orientation to stress conditions sufficient to disrupt the lattice structure and form a dipole of dislocation cores therein, and wherein the dipole of dislocation cores split and propagate in the nanotube in a manner such that the dislocation cores are separated by at least one domain of modified lattice structure, and wherein the physical property of the nanotube is altered, wherein said nanotube has a defined lattice structure orientation characterized by a (10,10) chirality vector, and wherein the domain of modified lattice structure has a chirality vector of (10,9).

19. The method according to claim 18, wherein the physical property is an electrical property.

20. The method according to claim 18, wherein said nanotube comprises carbon or boron nitride.

21. The method according to claim 18, wherein said subjecting step further comprises subjecting the nanotube to thermal conditions.

22. The method according to claim 21, wherein said subjecting step is carried out at a temperature ranging from about 500° C. to about 1800° C.

23. The method according to claim 18, wherein said method further comprises the step of subjecting the nanotube to radiation.

24. The method according to claim 22, wherein the radiation is ultraviolet light.

25. The method according to claim 18, wherein said subjecting step comprises subjecting the nanotube to stress selected from the group consisting of tensile stress, torsional stress, bending stress, and combinations thereof.

26. The method according to claim 18, wherein said subjecting step results in the nanotube elongating from about 3 to about 10 percent.

27. A method of modifying a physical property of a carbon nanotube, said method comprising:

subjecting the carbon nanotube having a hexagonal core lattice structure to stress and thermal conditions sufficient to disrupt the lattice structure and form a dipole of pentagon-heptagon and heptagon-pentagon dislocation cores therein, and wherein the dipole of dislocation cores propagate throughout the nanotube in a manner such that a domain of modified lattice structure is formed between the dipole of dislocation cores to alter a physical property of the nanotube, wherein said subjecting step results in the nanotube elongating from about 3 to about 10 percent.

28. The method according to claim 27, wherein said nanotube has a defined lattice structure orientation characterized by a (10,10) chirality vector, and wherein the domain of modified lattice structure has a chirality vector of (10,9).

29. The method according to claim 27, wherein the physical property is an electrical property.

30. The method according to claim 27, wherein said nanotube comprises carbon or boron nitride.

31. The method according to claim 27, wherein said subjecting step is carried out at a temperature ranging from about 500° C. to about 1800° C.

32. The method according to claim 27, wherein said method further comprises the step of subjecting the nanotube to radiation.

33. The method according to claim 32, wherein the radiation is ultraviolet light.

34. The method according to claim 27, wherein said subjecting step comprises subjecting the nanotube to stress selected from the group consisting of tensile stress, torsional stress, bending stress, and combinations thereof.

* * * * *

UNITED STATES PATENT AND TRADEMARK OFFICE
CERTIFICATE OF CORRECTION

PATENT NO. : 6,280,677 B1
DATED : August 28, 2001
INVENTOR(S) : Boris I. Yakobson It is certified that error appears in the above-identified patent and that said Letters Patent is hereby corrected as shown below:

Column 7,
Line 4, after "claim" please delete "22" and replace with -- 23 --

Signed and Sealed this

Ninth Day of April, 2002

Attest:

JAMES E. ROGAN
*Attesting Officer*  *Director of the United States Patent and Trademark Office*